(12) United States Patent
Pathak

(10) Patent No.: US 8,069,409 B2
(45) Date of Patent: Nov. 29, 2011

(54) CUSTOMIZED REMOTE ACCESS TO IMAGING NODE FRONT PANELS

(75) Inventor: Rabindra Pathak, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 768 days.

(21) Appl. No.: 11/899,421

(22) Filed: Sep. 6, 2007

(65) Prior Publication Data

US 2009/0066710 A1 Mar. 12, 2009

(51) Int. Cl.
*G06F 17/00* (2006.01)
*G06F 15/16* (2006.01)

(52) U.S. Cl. ........ 715/234; 715/204; 715/246; 715/249; 715/744; 709/203

(58) Field of Classification Search .................. 715/200, 715/203, 204, 205, 207, 209, 210, 226, 229, 715/231, 234, 236, 238, 239, 249, 251, 253, 715/255, 256, 273, 274, 275, 779, 235, 243, 715/700, 744, 746, 760, 762, 764, 765, 783, 715/788, 800; 709/201, 202, 203, 220, 223, 709/224, 225, 227, 229, 230
See application file for complete search history.

(56) References Cited

U.S. PATENT DOCUMENTS

| | | | | |
|---|---|---|---|---|
| 6,247,011 B1 * | 6/2001 | Jecha et al. | ............ | 707/999.009 |
| 6,289,371 B1 * | 9/2001 | Kumpf et al. | .................. | 709/203 |
| 6,449,638 B1 | 9/2002 | Wecker et al. | .................. | 709/217 |
| 6,631,375 B2 * | 10/2003 | Jecha et al. | ............ | 707/999.009 |
| 6,871,243 B2 * | 3/2005 | Iwase et al. | ..................... | 710/62 |
| 7,023,573 B2 * | 4/2006 | Ohhashi et al. | ............... | 358/1.15 |
| 7,142,333 B2 * | 11/2006 | Struble | ......... | 358/402 |
| 7,149,982 B1 * | 12/2006 | Duperrouzel et al. | ........ | 715/788 |
| 7,620,891 B2 * | 11/2009 | Aubert et al. | .................. | 715/236 |
| 7,689,830 B2 * | 3/2010 | Ishii | ............... | 713/182 |
| 2002/0059235 A1 * | 5/2002 | Jecha et al. | ....................... | 707/9 |
| 2002/0097262 A1 * | 7/2002 | Iwase et al. | .................. | 345/744 |
| 2003/0011633 A1 * | 1/2003 | Conley et al. | ................. | 345/762 |
| 2003/0078965 A1 * | 4/2003 | Cocotis et al. | ................ | 709/203 |
| 2005/0021756 A1 | 1/2005 | Grant | ............. | 709/226 |
| 2005/0061336 A1 | 3/2005 | Goetz et al. | ................... | 128/899 |
| 2005/0114767 A1 | 5/2005 | Sato | ............... | 709/203 |
| 2006/0069790 A1 * | 3/2006 | Surana | ............... | 709/230 |
| 2006/0109498 A1 * | 5/2006 | Ferlitsch | ..................... | 358/1.15 |
| 2006/0133829 A1 * | 6/2006 | Kato | .................. | 399/8 |
| 2006/0190813 A1 | 8/2006 | Neil et al. | ..................... | 715/513 |
| 2006/0218480 A1 * | 9/2006 | Moggert et al. | .............. | 715/500 |
| 2006/0245005 A1 * | 11/2006 | Hall et al. | ..................... | 358/448 |
| 2007/0094499 A1 * | 4/2007 | Dokuni | ......... | 713/168 |
| 2008/0079286 A1 * | 4/2008 | Ferlitsch et al. | ............ | 296/186.1 |
| 2008/0158581 A1 * | 7/2008 | Ferlitsch | ..................... | 358/1.13 |
| 2008/0309967 A1 * | 12/2008 | Ferlitsch et al. | ............. | 358/1.15 |

FOREIGN PATENT DOCUMENTS

| | | |
|---|---|---|
| JP | 2005/228106 | 8/2005 |
| JP | 2008/004105 | 1/2008 |

* cited by examiner

*Primary Examiner* — Maikhanh Nguyen
(74) *Attorney, Agent, or Firm* — Scot A. Reader

(57) ABSTRACT

Methods and systems for customized remote access to imaging node front panels offer improvements in the areas of unified access, on-screen viewing and comprehension of front panels delivered by diverse imaging nodes to remote client nodes. The imaging nodes may be diverse, for example, in terms of message formats used to deliver front panel data, screen resolution assumptions implicit in front panel data and languages in which front panel data are delivered. Customization is provided, in some embodiments, by a server node that intermediates between the imaging nodes and the client nodes.

16 Claims, 4 Drawing Sheets

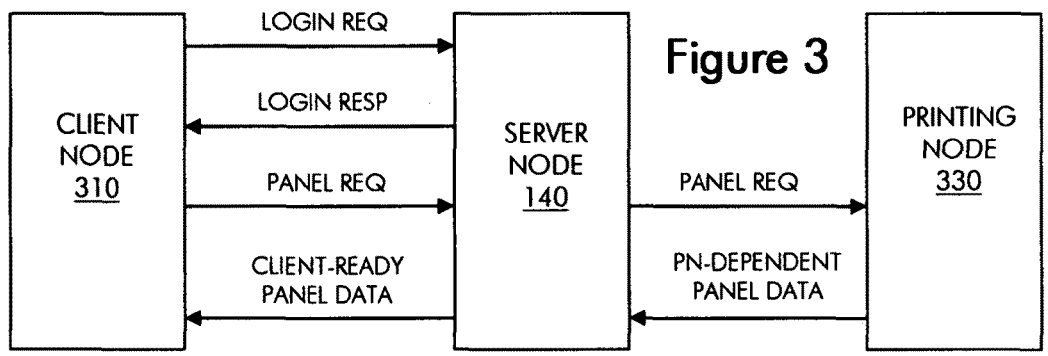
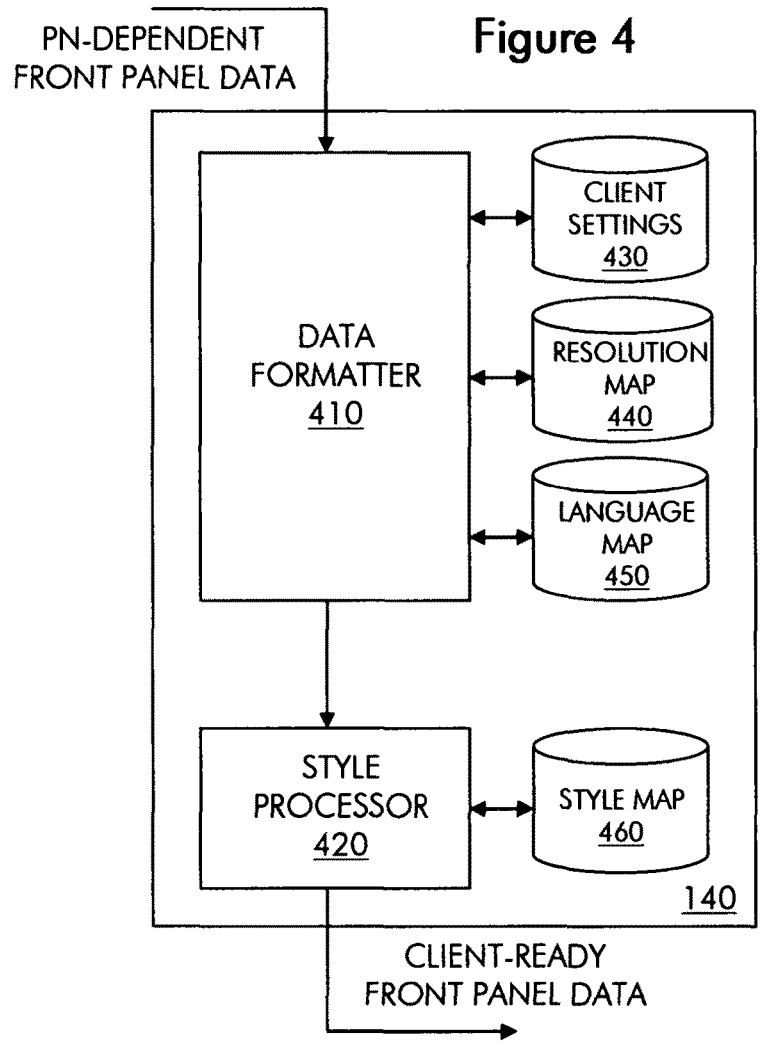

Figure 6

```
<?xml version="1.0" encoding="utf-8"?>
<xs:schema attributeFormDefault="unqualified" elementFormDefault="qualified" version="1.0"
xmlns:xs="http://www.w3.org/2001/XMLSchema">
  <xs:element name="SupportedModels">
    <xs:complexType>
      <xs:sequence>
        <xs:element maxOccurs="unbounded" name="Model">
          <xs:complexType>
            <xs:sequence>
              <xs:element maxOccurs="unbounded" name="Resolutions">
                <xs:complexType>
                  <xs:sequence>
                    <xs:element name="CurrentResolution" type="xs:string" />
                    <xs:element maxOccurs="unbounded" name="Screen">
                      <xs:complexType>
                        <xs:sequence>
                          <xs:element name="ScreenName" type="xs:string" />
                          <xs:element name="Components">
                            <xs:complexType>
                              <xs:sequence>
                                <xs:element maxOccurs="unbounded" name="ComponentName">
                                  <xs:complexType>
                                    <xs:sequence>
                                      <xs:element name="Coordinates" type="xs:string" />
                                    </xs:sequence>
                                    <xs:attribute name="Component" type="xs:string" use="required" />
                                  </xs:complexType>
                                </xs:element>
                              </xs:sequence>
                            </xs:complexType>
                          </xs:element>
                        </xs:sequence>
                      </xs:complexType>
                    </xs:element>
                  </xs:sequence>
                </xs:complexType>
              </xs:element>
            </xs:sequence>
            <xs:attribute name="name" type="xs:string" use="required" />
          </xs:complexType>
        </xs:element>
      </xs:sequence>
    </xs:complexType>
  </xs:element>
</xs:schema>
```

CUSTOMIZED REMOTE ACCESS TO IMAGING NODE FRONT PANELS

BACKGROUND OF THE INVENTION

The present invention relates to remote access to imaging nodes and, more particularly, to customized remote access to imaging node front panels.

It is known to provide a client node remote access to an imaging node front panel so that a user of the client node can remotely view the front panel and/or remotely control the imaging node from the client node. However, known schemes for remotely accessing front panels of imaging nodes have presented certain problems. First, in network environments where there are multiple imaging nodes, different imaging nodes may deliver front panel data in different message formats. Some imaging nodes may deliver front panel data in eXtensible Markup Language (XML) files wherein each XML element describes a component of the front panel, while other imaging nodes may deliver front panel data in a Web Services message wherein a Simple Object Access Protocol (SOAP) message describes components of the front panel, while still other imaging nodes may deliver front panel data in a HyperText Markup Language (HTML) document or even a proprietary format. The disparate message formats can prevent the user of the client node from remotely accessing the front panels of desired imaging nodes in a unified manner, for example, using a Web browser installed on the client node.

Second, the front panel data that are delivered are often optimized for viewing at a screen resolution that is determined by the imaging node. If the screen resolution determined by the imaging node does not match the screen resolution operative on the client node, when rendered on the client node the front panel image may appear distorted and in some cases stray off-screen.

Third, the front panel data that are delivered may not be in the user's preferred language. In geographically dispersed network environments, an imaging node may deliver front panel data to the client node in a language different than the language operative on the client node. In that event, text within the front panel data that the client node is unable to translate may not be understood by the user and in some cases may appear mangled on-screen.

SUMMARY OF THE INVENTION

The present invention, in a basic feature, provides customized remote access to imaging node front panels. The invention offers improvements in the areas of unified access, on-screen viewing and comprehension of front panels delivered by diverse imaging nodes to remote client nodes. The imaging nodes may be diverse, for example, in terms of message formats used to deliver front panel data, screen resolution assumptions implicit in front panel data and languages in which front panel data are delivered. Customization is provided, in some embodiments, by a server node that intermediates between the imaging nodes and the client nodes.

In one aspect, an imaging system comprises a client node, an imaging node and a server node operatively coupled with the client node and the imaging node via a communication network, wherein in response to a request received from the client node the server node obtains front panel data from the imaging node, customizes the front panel data for presentation on the client node and transmits the customized front panel data to the client node.

In some embodiments, the server node adapts the front panel data to conform to a screen resolution operative on the client node.

In some embodiments, the server node adapts the front panel data to conform to a language operative on the client node.

In some embodiments, the server node adapts the front panel data to conform to a message format operative on the client node.

In some embodiments, the server node converts the front panel data into an HTML format based on application of an extensible Stylesheet Language (XSL) style sheet to an XML file created on the server node using the front panel data and settings associated with the client node.

In some embodiments, the server node adapts the front panel data using settings associated with the client node stored on the server node.

In some embodiments, the request identifies an imaging node from which front panel data is to be obtained.

In some embodiments, the customized front panel data comprise information sufficient to enable the client node to construct and render graphically on the client node at least part of a front panel of the imaging node.

In another aspect, a server node comprises at least one network interface, a memory and a processor communicatively coupled with the network interface and the memory, wherein in response to a request received from a client node on the network interface the processor obtains via the network interface front panel data from an imaging node, applies settings associated with the client node stored in the memory to customize the front panel data for presentation on the client node and transmits via the network interface the customized front panel data to the client node.

In yet another aspect, a method for remote access to an imaging node front panel comprises the steps of receiving from a client node a request, obtaining from an imaging node in response to the request front panel data, customizing the front panel data for presentation on the client node and transmitting to the client node the customized front panel data.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 3 shows message flows within the imaging system.

FIG. 4 shows functional elements of the server node of FIG. 1.

FIG. 6 shows an exemplary XML schema for the resolution map of FIG. 4.

DETAILED DESCRIPTION OF A PREFERRED EMBODIMENT

Figure 1:
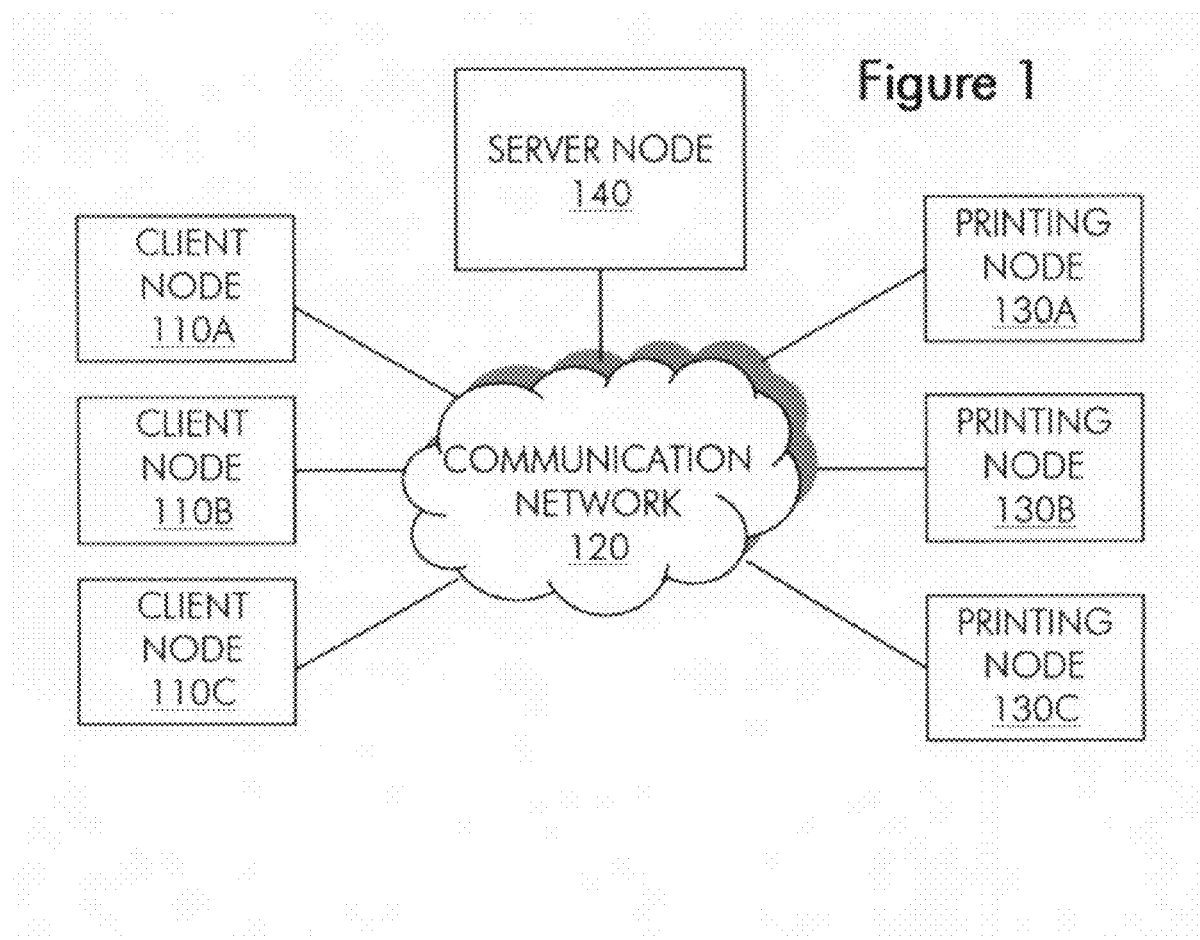
FIG. 1 shows an imaging system in which the invention is operative in some embodiments.

FIG. 1 shows an imaging system in which the invention is operative in some embodiments. The imaging system includes multiple client nodes 110 and multiple printing nodes 130 communicatively coupled with a server node 140 over a communication network 120. Naturally, while three each of client nodes 110 and printing nodes 130 are shown, an imaging system within the scope of the invention may have varying numbers of client nodes and printing nodes. Moreover, while in the embodiments described herein the imaging system is a printing system, the invention is applicable to other imaging systems, such as scanning, copying and faxing systems, wherein the imaging nodes are scanning nodes, copying nodes and faxing nodes, respectively, and is also applicable to hybrid imaging systems having multiple types of imaging nodes.

Client nodes 110 are data communication devices, such as a desktop personal computers, laptop personal computers, workstations and/or personal data assistants (PDAs), that are capable of remotely accessing front panels of printing nodes 130 and rendering the front panels on graphical user interfaces (GUIs) of client nodes 110, such as cathode ray tubes (CRTs), liquid crystal display (LCD) screen or light emitting diode (LED) display screen. Remote access to front panels is initiated by transmitting requests via wired or wireless network interfaces of client nodes 110, such as local area network (LAN) or wide area network (WAN) interfaces. Remote access to front panels is facilitated by server node 140, which services requests for front panels initiated by client nodes 110 and customizes front panels for presentation on client nodes 110. Client nodes 110 have Web browser software, such as Microsoft Internet Explorer® or Mozilla Firefox®, installed thereon for communicating with server node 140 and viewing HTML documents received from server node 140, including HTML documents with front panel data.

Communication network 120 is a data communication network that may include one or more wired or wireless LANs, WANs, WiMax networks and/or ad-hoc networks each of which may have one or more data communication nodes, such as switches, routers, bridges and/or hubs, operative to communicatively couple client nodes 110 and printing nodes 130 via server node 140. In some embodiments, communication network 120 traverses the Internet.

Printing nodes 130 are printing devices having respective wired or wireless network interfaces, such as a LAN or WAN interfaces, that communicatively couple printing nodes 130 with communication network 120. Printing nodes 130 may be geographically dispersed. Printing nodes 130 are capable of receiving via their respective network interfaces requests for front panels initiated on client nodes 110 and serviced by server node 140, processing the requests and transmitting front panel data to server node 140 in response to the requests. In some embodiments, printing nodes 130 are multifunction printing (MFP) nodes that provide multiple types of imaging services, such as scanning, copying and faxing. Printing nodes 130 have respective front panels for accepting input from users and displaying output to users. A front panel may include, for example, a power button, a cancel button, hard keys, soft keys, and an LCD or LED screen rendering options associated with soft keys, such as duplex mode, color mode, exposure, as well as information about node configuration, jobs and status. On different printing nodes 130, the front panel may display text in different languages, such as English, Japanese and French, depending on manufacturer specifications or language selections made by users, for example. Internal to each printing node 130A, 130B, 130C, the front panel and network interface are communicatively coupled with a processor (CPU), a memory, a print engine and, in some embodiments, a scan, copy and/or fax engine. The front panel display screen is rendered locally under the control of the CPU, which can also transmit front panel data so that the front panel, or components thereof, can be rendered remotely. The print engine includes printer logic, such as one or more integrated circuits (IC), and a mechanical section for performing printing functions. For example, the print engine may have a color ink jet head mounted on a movable carriage for outputting a hard copy of print jobs under the control of a printer IC.

Figure 2:
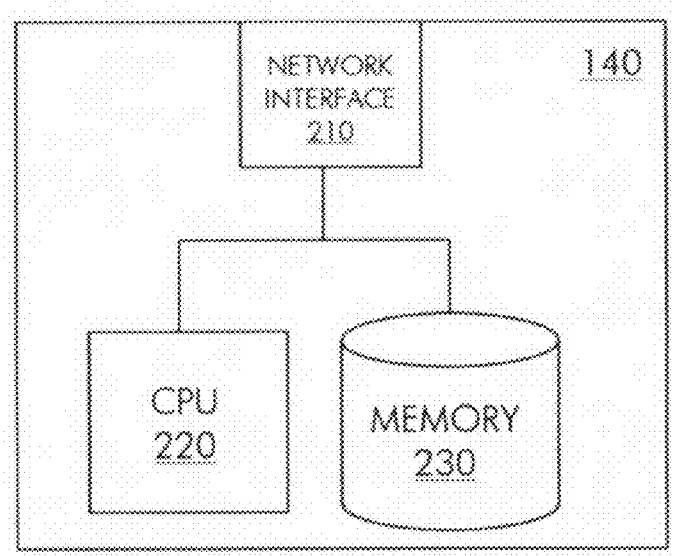
FIG. 2 shows the server node of FIG. 1 in more detail.

FIG. 2 shows server node 140 in more detail. Server node 140 is a data communication device that facilitates remote access of client nodes 110 to front panels of printing nodes 130. Server node 140 authenticates users of client nodes 110, services requests for front panels initiated by client nodes 110 and received via a network interface 210 of server node 140, which may be a wired or wireless LAN or WAN interface, for example, and customizes front panels for presentation on client nodes 110. Authentication, request servicing and front panel customization are performed using software executed by a CPU 220 resident on server node 140 in conjunction with data stored in memory 230, which may include one or more random access memories (RAMs) and one or more read only memories (ROM).

Referring to FIG. 3, message flows within the imaging system are shown. In the message flows, client node 310, which is representative of client nodes 110, and server node 140 communicate using Hypertext Transfer Protocol (HTTP) messages wherein client node 310 receives input from a user of client node 310 and transmits output to the user of client node 310 via a Web browser. Server node 140 communicates with printing node 330, which is representative of printing nodes 130, using TCP/IP-based flows.

More particularly, client node 310 transmits a login request (LOGIN REQ) to server node 140. In response, server node 140 authenticates the user of client node 310 and returns to client node 310 a login response (LOGIN RESP) indicating that client node 310 has access to the imaging system. In some embodiments, server node 140 also transmits to client node 310 a list of printing nodes to which client node 310 has access. In some embodiments, server node 140 may authenticate client node 310 instead of or in addition to the user of client node 310.

Client node 310 then transmits to server node 140 a request for the front panel of printing node 330 (PANEL REQ), which is selected by the user of client node 310 from among printing nodes to which client node 310 has access. Server node 140 adapts the request to the extent necessary to conform to protocol requirements of printing node 330 and relays the request to printing node 330. In this regard, printing nodes 130 may support different communication protocols, and server node 140 adapts the request received from client node 310 as an HTTP request as necessary to be understood and processed by the particular printing node 330 from which the front panel is requested. In response, printing node 330 processes the request and returns to server node 140 a message including printing node (PN)-dependent front panel data. In some embodiments, the PN-dependent front panel data is transmitted in an XML file wherein each XML element describes a component of the front panel. In other embodiments, the PN-dependent front panel data is transmitted in a Web Services message wherein a SOAP message describes components of the front panel. In still other embodiments, the PN-dependent front panel data is transmitted in an HTML document. In still other embodiments, the PN-dependent front panel data is transmitted in a proprietary format. In any event, server node 140 converts the PN-dependent front panel data as necessary to produce client-ready front panel data and then transmits the client-ready front panel data to client node 310.

The conversion from PN-dependent front panel data to client-ready front panel data performed by server node 140 customizes the front panel data for presentation on client node 310. Such conversion includes adapting the front panel data to conform to a screen resolution operative on client node 310, a language operative on client node 310 and a message format supported on client node 310. With regard to the message format, server node 140 converts the front panel data into an HTML format for viewing using a Web browser installed on client node 310. This conversion is achieved through application of an XSL style sheet to an XML file created on server node 140 using the PN-dependent front panel data and settings associated with client node 310. The client-ready front panel data includes information sufficient to enable client node 310 to construct and render graphically on a GUI of client node 310 the front panel of printing node 330, or components thereof. The rendered information provides the user of client node 310 a snapshot of the front panel of printing node 330 as of the time printing node 330 collected the PN-dependent front panel data.

A functional representation of server node 140 is shown in FIG. 4 includes a data formatter 410, a style processor 420, client settings 430, a resolution map 440, a language map 450 and a style map 460. Data formatter 410 and style processor 420 are software modules that execute on CPU 220. Client settings 430, resolution map 440, language map 450 and style map 460 are databases stored in memory 230 that are accessed by these software modules to customize front panel data received from printing nodes 130 for presentation on client nodes 110. While described herein as databases, client settings 430, resolution map 440, language map 450 and style map 460 may be temporary files or runtime data structures, for example. Naturally, server node 140 includes other software modules and databases that are invoked, for example, to authenticate users to the imaging system.

Client settings 430 include, for each client node 110A, 110B, 110C within the imaging system, information on the screen resolution and language operative on the client node 110A, 110B, 110C.

Resolution map 440 includes a configuration file in XML format that provides, for each combination of printing node model, client node screen resolution and front panel user screen supported in the imaging system, a mapping of front panel components to client node screen coordinates. Turning momentarily to FIG. 6, an exemplary XML schema for resolution map 440 is shown. For each combination of printing node model (e.g. MX-3500, AX-0035), client node screen resolution (e.g. 1024:768, 800:600) and front panel user screen (e.g. home page, reboot screen) supported in the imaging system, a mapping is provided between front panel components and client node screen coordinates. For example, where the printing node model is MX-3500, the client node screen resolution is 1024:768 and the front panel home page is to be rendered on the client node screen, the mapping may specify that the home page banner is to be rendered at 10:10, the horizontal menu at 50:50, the left-hand menu at 10:90, and the action button at 100:100. However, where the screen resolution is 800:600, the front panel home page mapping may specify instead that the home page banner is to be rendered at 5:5, the horizontal menu at 45:45, the left-hand menu at 5:85, and the action button at 95:95.

Language map 450 includes, for each language supported within imaging system, a mapping of front panel character strings and translations.

Style map 460 includes an XSL style sheet having a set of rules for application to XML files created using the front panel data, client settings 430, resolution map 440 and language map 450 to generate an HTML document for transmission to client nodes 110.

Resolution map 440, language map 450 and style map 460 may be configured on server node 140 through manual data entry, for example.

Server node 140 may discover client settings 430 through auto-discovery or manual data entry, for example. Auto-discovery of client settings 430 may be initiated by server node 140, for example, by querying client nodes 110 via communication network 120 for their respective screen resolutions and languages. Alternatively, auto-discovery of client settings 430 may be initiated by client nodes 110, for example, by registering with server node 140 via communication network 120 their respective screen resolutions and languages. Auto-discovery may be periodic or event-driven. A secure communication protocol may be used to ensure that client information is not compromised while in transit.

Figure 5:
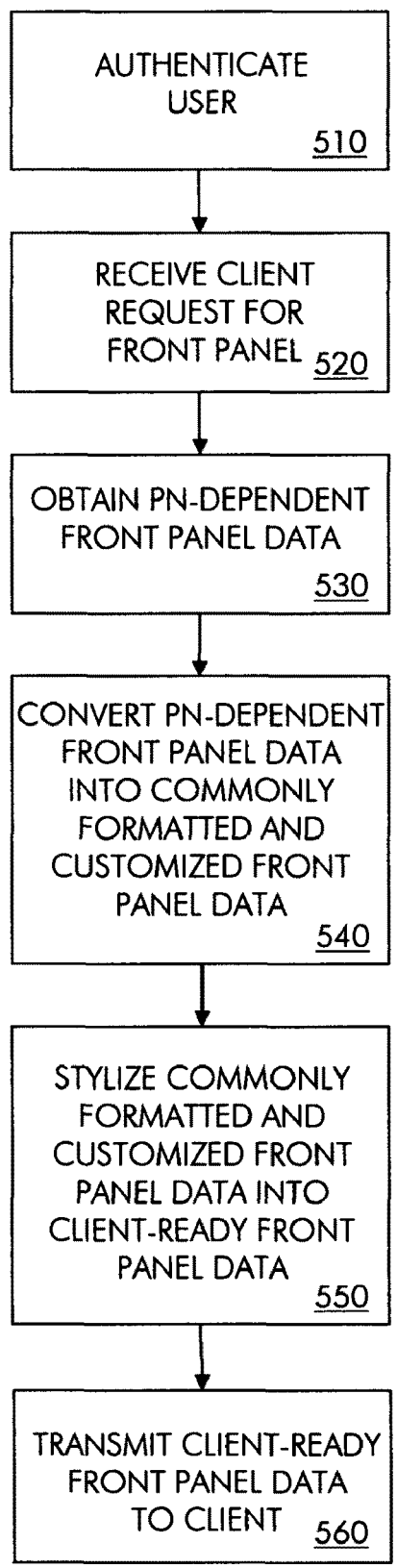
FIG. 5 shows a method for customized remote access to an imaging node front panel in some embodiments of the invention.

FIG. 5 shows a method for customized remote access to an imaging node front panel in some embodiments of the invention. Server node 140 authenticates the user of client node 310 (510) and receives from client node 310 a request for a front panel of printing node 330 (520). Server node 140 transmits to printing node 330 a corresponding request and obtains in response PN-dependent front panel data (530).

Next, server node 140 converts the PN-dependent front panel data into commonly formatted and customized front panel data, in particular, an XML file that is customized for presentation on client node 310 with regard to screen resolution and language (540). Data formatter 410 receives PN-dependent front panel data as an input, converts the PN-dependent front panel data into an XML file and provides the XML file as an output. Data formatter 410 invokes client settings 430, resolution map 440 and language map 450 to complete these operations. More particularly, data formatter 410 extracts from client settings 430 the screen resolution operative on client node 310 and applies this information to resolution map 440 to map front panel components to client node screen coordinates. Data formatter 410 also extracts from client settings 430 the language operative on client node 310 and applies this information to language map 450 to translate front panel character strings into the language operative on client node 310. Data formatter 410 then generates an XML file wherein each XML element describes a component of the front panel including client node screen coordinates and the translated character strings and passes the XML file to style processor 420.

Next, server node 140 stylizes the commonly formatted and customized front panel data, in particular, using an XSL style sheet, to produce client-ready front panel data, in particular, an HTML document (550). Style processor 420 receives the XML file as an input, converts the XML file into an HTML document and provides the HTML document as an output. Style processor 420 invokes style map 460 to complete these operations. More particularly, style processor 420 applies the rules defined in an XSL style sheet in style map 460 to convert the XML file into an HTML document suitable for rendering on client node 310 using a Web browser.

It will be appreciated by those of ordinary skill in the art that the invention can be embodied in other specific forms without departing from the spirit or essential character hereof. For example, in some embodiments a style processor can convert the XML file into alternative message formats suitable for rendering on client nodes that support such message formats, such as Wireless Markup Language (WML) for camera phones and compact HTML (cHTML) for i-mode cell phones. The present description is therefore considered in all respects to be illustrative and not restrictive. The scope of the invention is indicated by the appended claims, and all changes that come with in the meaning and range of equivalents thereof are intended to be embraced therein.

What is claimed is:

1. An imaging system including at least one processor for customized remote access to imaging node front panels, the system comprising:
   a client node configured to transmit a request for an imaging node front panel in a client node-dependent format, receive a response to the request containing imaging node front panel data in a client node-ready display format, and display the imaging node front panel on the client node using the imaging node front panel data;
   an imaging node configured to receive a request for the imaging node front panel in an imaging node-ready format and transmit a response to the request containing the imaging node front panel data in an imaging node-dependent display format; and
   a server node communicatively coupled between the client node and the imaging node and configured to receive the request from the client node in the client node-dependent format, convert the request from the client node-dependent format to the imaging node-ready format and transmit the request to the imaging node in the imaging node-ready format, and further configured to receive the response from the imaging node containing the imaging node front panel data in the imaging node-dependent display format, convert the imaging node front panel data from the imaging node-dependent display format to the client node-ready display format and transmit the response to the client node containing the imaging node front panel data in the client node-ready display format,
   wherein the server node converts the imaging node front panel data at least in part by adapting the front panel data to conform to a screen resolution operative on the client node, and
   wherein adapting the front panel data to conform to the screen resolution operative on the client node comprises mapping front panel components to client node screen coordinates.

2. The imaging system of claim 1, wherein the server node converts the imaging node front panel data at least in part by adapting the front panel data to conform to a language operative on the client node.

3. The imaging system of claim 2, wherein adapting the front panel data to conform to the language operative on the client node comprises translating front panel character strings into the language.

4. The imaging system of claim 1, wherein the server node converts the imaging node front panel data at least in part by adapting the front panel data to conform to a message format operative on the client node.

5. The imaging system of claim 4, wherein adapting the front panel data to conform to the message format operative on the client node comprises converting the front panel data into a HyperText Markup Language (HTML) document.

6. The imaging system of claim 4, wherein adapting the front panel data to conform to the message format operative on the client node comprises converting the front panel data into an eXtensible Markup Language (XML) file and converting the XML file into a HTML document using an eXtensible Stylesheet Language (XSL) style sheet.

7. The imaging system of claim 1, wherein the client node is further configured to transmit an authentication request and receive a response to the authentication request, and wherein the server node is configured to receive from the client node the authentication request and transmit to the client node the response to the authentication request.

8. The imaging system of claim 1, wherein the imaging node front panel displayed on the client node is a snapshot of a front panel of the imaging node.

9. A server node, comprising:
   at least one network interface configured to receive a request from a client node for an imaging node front panel in a client node-dependent format and transmit the request to an imaging node in an imaging node-ready format, and further configured to receive a response to the request from the imaging node containing imaging node front panel data in an imaging node-dependent display format and transmit the response to the client node containing the imaging node front panel data in a client node-ready display format; and
   a processor communicatively coupled with the network interface and configured to convert the request from the client node-dependent format to the imaging node-ready format, and further configured to convert the imaging node front panel data from the imaging node-dependent display format to the client node-ready display format,
   wherein the processor converts the imaging node front panel data at least in part by adapting the front panel data to conform to a screen resolution operative on the client node, and
   wherein adapting the front panel data to conform to the screen resolution operative on the client node comprises mapping front panel components to client node screen coordinates.

10. The server node of claim 9, wherein the processor converts the imaging node front panel data at least in part by adapting the front panel data to conform to a language operative on the client node.

11. The server node of claim 10, wherein adapting the front panel data to conform to the language operative on the client node comprises translating front panel character strings into the language.

12. The server node of claim 9, wherein the processor converts the imaging node front panel data at least in part by adapting the front panel data to conform to a message format operative on the client node.

13. The server node of claim 12, wherein adapting the front panel data to conform to the message format operative on the client node comprises converting the front panel data into a HTML document.

14. The server node of claim 12, wherein adapting the front panel data to conform to the message format operative on the client node comprises converting the front panel data into an XML file and converting the XML file into a HTML document using an XSL style sheet.

15. The server node of claim 9, wherein the network interface is configured to receive from the client node an authentication request and transmit to the client node a response to the authentication request.

16. The server node of claim 9, wherein the processor converts the imaging node front panel data at least in part by consulting client node settings stored on the server node that provide information about the screen resolution and language operative on the client node.

* * * * *